: 2,710,788
Patented June 14, 1955

2,710,788

TREATMENT OF SODIUM CYANIDE

Harry B. Copelin, Niagara Falls, N. Y., assignor to E. I. du Pont de Nemours and Company, Wilmington, Del., a corporation of Delaware No Drawing. Application October 29, 1953,
Serial No. 389,167

2 Claims. (Cl. 23—84)

This invention relates to the production of sodium cyanide and more particularly to the production of sodium cyanide of a low caustic content.

Various methods of manufacturing sodium cyanide by the neutralization of aqueous caustic soda solutions with hydrogen cyanide have been known for many years. U. S. P. 716,350 to Roessler, for example, showed such a process as long ago as 1902. Despite their age, these processes, which may be generically termed wet processes, have not attained great popularity because of the technical difficulties inherent in their operation. These difficulties frequently result in a low-quality product containing a high percentage of impurities, principally sodium carbonate, sodium formate and residual sodium hydroxide. Colored polymers of hydrogen cyanide may also be formed but these can be avoided by maintenance of a high caustic concentration throughout the reacting system. Use of a high concentration of sodium hydroxide, however, tends to increase the quantity of inorganic impurities in the finished cyanide, particularly that of caustic itself.

The importance of controlling the incidence of contaminants in the product sodium cyanide may be seen from the fact that some commercial specifications require a product containing 96–98% sodium cyanide, less than 1% sodium hydroxide and formate combined, and a remainder largely consisting of sodium carbonate. A large part of the commercial cyanide produced under these specifications is used in organic synthesis, particularly in the cyanation of organic halides. Excess alkalinity in such cyanation reactions tends to increase the formation of by-products, especially ethers and tarry compounds. It is, therefore, essential that the caustic content of the cyanide be reduced to a minimum.

Impurities may be formed in the wet cyanide processes at any stage of the proceedings but particularly during the requisite concentration and drying steps. A high caustic level in these stages, may, as noted, prevent the formation of colored polymers and also repress the production of formate. The higher the concentration of sodium hydroxide in the formation stages, however, the higher the concentration will be in the sodium cyanide produced. Sodium cyanide crystallized from its saturated solution will carry down about one-third of its weight in mother liquor. If the mother liquor contains 3% sodium hydroxide, a concentration found desirable in some applications, the permissible caustic-formate specification in the dried sodium cyanide will be made-up by caustic alone. Use of minimal sodium hydroxide concentrations of up to around 3% in wet cyanide processes is claimed in copending application S. N. 369,034 of common assignment herewith.

Although wet processes suffer from several defects, they nevertheless remain desirable because they afford a relatively cheap means of producing cyanides. An object of this invention is, therefore, provision of a method for obtaining sodium cyanide of relatively low caustic content from a wet manufacturing process. An additional object is provision of a method whereby a high caustic level wet cyanide process can be used to produce ultimately sodium cyanide of tolerable caustic content. Another and general object of the invention is provision of a method of reducing the concentration of sodium hydroxide in sodium cyanide produced by any process.

The above-mentioned and still further objects of the invention may be achieved by a process in which dry sodium cyanide from any source, but containing sodium hydroxide, is subjected to treatment with gaseous carbon dioxide. The quantity of carbon dioxide needed is relatively small and should be diluted before contacting the cyanide. In practice a current of air enriched with respect to carbon dioxide may be passed over the dry sodium cyanide. The carbon dioxide is preferentially absorbed by the sodium hydroxide and cyanide is not normally displaced. This fact is somewhat surprising as carbon dioxide is more acidic than hydrogen cyanide and will displace the latter in solution. Cyanides exposed to the air for long periods of time are actually converted to the carbonate. Selective replacement of the hydroxide will, however, occur if the concentration of the carbon dioxide is not too high, if the exposure time is not too long and if the sodium cyanide treated is dry. Tests show that if the sodium cyanide is at all moist and is treated with carbon dioxide, the cyanide will be discolored. The discoloration is caused by displacement of hydrogen cyanide by carbon dioxide and the subsequent formation of colored cyanide polymers.

There follow several examples illustrating in more detail the practice of the invention.

EXAMPLE 1

A series of runs was made by passing carbon dioxide enriched air counter-currently over sodium cyanide crystals at the dry end of a conventional dryer. The crystals had been obtained by filtering the slurry formed by neutralizing aqueous caustic with hydrogen cyanide and partially evaporating the resultant solution. The wet crystals carried about 30% by weight of mother liquor. The dryer utilized was steam heated by coils at a temperature of about 175° C. The linear velocity of the stream of air through the dryer was about 40 ft./min. Absorption of the dioxide by the dry cyanide was so rapid that no discoloration of the wet material occurred. In all except the first two runs, 0.5% carbon dioxide was added to the air before its passage through the dryer. Results are shown in Table I. In each case, the dry product showed about 98% sodium cyanide.

Table I: Effect of carbon dioxide on product

| Run | Percent Carbonate In Dry Product | Percent Caustic In Dry Product | Remarks |
|---|---|---|---|
| 1 | 0.56 | 0.36 | No $CO_2$ added to air. |
| 2 | 0.94 | 0.33 | Do. |
| 3 | 1.04 | 0.11 | Air containing 0.5% $CO_2$ through dryer for 1¾ hrs. |
| 4 | 1.11 | 0.03 | Air containing 0.5% $CO_2$ through dryer for 2¼ hrs. |
| 5 | 1.14 | 0.11 | Air containing 0.5% $CO_2$ through dryer for 3 hrs. |

It will be seen from these results that the carbon dioxide addition to the air used in the dryer markedly reduced the concentration of sodium hydroxide in the product without increasing carbonate above tolerable limits. No discoloration or other evidence of the formation of hydrogen cyanide was noted in the runs of either this or the following example.

EXAMPLE 2

Carbon dioxide enriched air was passed co-currently over completely dry powered sodium cyanide moving down a packaging chute. Contact time between the cyanide and carbon dioxide was 6–7 minutes at a temperature of 100–120° C. Ambient pressure was utilized. About 7500 lbs./hr. of the cyanide passed through the chute. The effect of carbon dioxide treatment on the excess caustic content is shown by Table II.

*Table II: Effect of $CO_2$ on co-current NaCN*

| $CO_2$ Feed Rate, Lbs./hr. | Percent Excess Caustic in NaCN | |
|---|---|---|
| | Before Treatment | After Treatment |
| 50 | 0.5 | 0.2 |
| 54 | 0.22 | 0.08 |
| 70 | 0.3 | 0.1 |

Several modifications in the procedure described above will be evident to those skilled in the chemical arts. The percentage of carbon dioxide utilized to enrich the air utilized need not, for example, be kept precisely at 0.5% by volume. Up to 1% can be tolerated and even higher values may be used for short periods of time. Care should be taken when highly enriched air is employed that the desired cyanide is not converted to carbonate. A period of about an hour and one-half in the stream of air is perfectly acceptable if the air contains about 0.5% carbon dioxide but may be too long for good results when more carbon dioxide is employed. The temperature of the treatment is also not critical but may vary within limits of about 80–200° C.

Since still further changes in procedure may be accomplished without departing from the spirit of the invention, I propose to be bound solely by the appended claims.

I claim:

1. The method of reducing the sodium hydroxide content of dry sodium cyanide which comprises passing a stream of dry air carrying about 0.5–1.0% carbon dioxide over said sodium cyanide at a temperature of about 100° C.–120° C. for a total contact time of about 6–7 minutes.

2. The method of reducing the sodium hydroxide content of dry sodium cyanide which comprises passing a stream of dry air enriched to contain up to about 1% carbon dioxide over said sodium cyanide at a temperature of 80°–200° C. for a total contact time not exceeding about one and one-half hours.

References Cited in the file of this patent
UNITED STATES PATENTS

| | | |
|---|---|---|
| 1,295,049 | Metzer | Feb. 18, 1919 |
| 1,311,232 | Jacobs | July 29, 1919 |